United States Patent
Gao et al.

(10) Patent No.: US 9,115,241 B2
(45) Date of Patent: Aug. 25, 2015

(54) BRANCHED POLYESTER POLYMERS AND SOFT TOUCH COATINGS COMPRISING THE SAME

(71) Applicant: PPG Industries Ohio, Inc., Cleveland, OH (US)

(72) Inventors: Renlong Gao, Allison Park, PA (US); Irina G. Schwendeman, Wexford, PA (US); Debra L. Singer, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/245,399

(22) Filed: Apr. 4, 2014

(65) Prior Publication Data

US 2014/0220354 A1    Aug. 7, 2014

Related U.S. Application Data

(63) Continuation-in-part of application No. 12/752,570, filed on Apr. 1, 2010.

(51) Int. Cl.
| C08F 299/04 | (2006.01) |
| C08G 63/181 | (2006.01) |
| C09D 167/02 | (2006.01) |
| C09D 167/06 | (2006.01) |

(52) U.S. Cl.
CPC ............ C08F 299/04 (2013.01); C08G 63/181 (2013.01); C09D 167/02 (2013.01); C09D 167/06 (2013.01); Y10T 428/31507 (2015.04); Y10T 428/31681 (2015.04); Y10T 428/31786 (2015.04)

(58) Field of Classification Search
CPC .. C08G 63/181; C08F 299/04; C09D 167/02; C09D 167/06; Y10T 428/31507; Y10T 428/31681; Y10T 428/31876
USPC ............................ 525/447; 528/303, 304, 306
See application file for complete search history.

(56) References Cited

U.S. PATENT DOCUMENTS

| 3,247,640 A | 4/1966 | De Wayne Miles et al. |
| 3,485,733 A | 12/1969 | D'Alelio |
| 3,804,920 A | 4/1974 | Cunningham et al. |
| 3,953,403 A | 4/1976 | Fujiyoshi et al. |
| 4,071,578 A | 1/1978 | Lasher |
| 4,229,555 A | 10/1980 | Tobias et al. |
| 4,240,947 A | 12/1980 | Falk |
| 4,393,121 A | 7/1983 | Tobias et al. |
| 4,426,478 A | 1/1984 | Noyes et al. |
| 4,463,150 A | 7/1984 | Kelley |
| 4,520,188 A | 5/1985 | Holzrichter et al. |
| 4,968,775 A | 11/1990 | Toman et al. |
| 5,227,460 A | 7/1993 | Mahabadi et al. |
| 5,380,816 A | 1/1995 | Sullivan |
| 5,391,452 A | 2/1995 | Sacripante et al. |
| 5,763,099 A | 6/1998 | Misev et al. |
| 5,830,928 A | 11/1998 | Faler et al. |
| 5,929,197 A | 7/1999 | Kohler et al. |
| 6,077,917 A | 6/2000 | Tachika et al. |
| 6,194,525 B1 | 2/2001 | Ortiz et al. |
| 6,214,898 B1 | 4/2001 | Diloy Barrio |
| 6,268,464 B1 | 7/2001 | Keinänen et al. |
| 6,291,581 B1 | 9/2001 | Bayards et al. |
| 6,413,648 B1 | 7/2002 | Heyenk et al. |
| 6,812,269 B2 | 11/2004 | Koenraadt et al. |
| 6,897,265 B2 | 5/2005 | Algrim et al. |
| 7,071,267 B2 | 7/2006 | Algrim et al. |
| 7,381,472 B2 | 6/2008 | Brandenburger et al. |
| 2001/0020048 A1 | 9/2001 | Yamaguchi et al. |
| 2004/0039087 A1 | 2/2004 | Nishikubo et al. |
| 2004/0044117 A1 | 3/2004 | Kiefer-Liptak et al. |
| 2006/0116487 A1* | 6/2006 | Brunelle et al. .............. 525/437 |
| 2011/0244156 A1 | 10/2011 | Lock et al. |

FOREIGN PATENT DOCUMENTS

| CA | 2010012 | 8/1990 |
| WO | WO 95/05413 | 2/1995 |
| WO | 9738034 | 10/1997 |
| WO | 0055265 | 9/2000 |

OTHER PUBLICATIONS

Utech, B.; A Guide to High-performance Powder Coating, 2002, p. 1-3.*

Misev, T.A. et al., "Powder coatings technology: new developments at the turn of the century", Progress in Organic Coatings; Apr. 28, 1998; pp. 160-168; vol. 34; Elsevier Science S.A.

Pourreau, Daniel B. et al., "Bang for the Buck", Modern Paint & Coatings; Oct. 1999; pp. 1-4; Lyondell.

* cited by examiner

*Primary Examiner* — Robert Jones, Jr.
(74) *Attorney, Agent, or Firm* — Diane R. Meyers

(57) ABSTRACT

A crosslinkable, branched polyester prepared by free radical polymerization of unsaturated polyester prepolymers, wherein the polymerization occurs primarily by reaction of the unsaturation is disclosed. Coatings comprising the same are also disclosed, as are substrates coated at least in part with such coatings.

21 Claims, No Drawings

BRANCHED POLYESTER POLYMERS AND SOFT TOUCH COATINGS COMPRISING THE SAME

CROSS REFERENCE TO RELATED APPLICATIONS

This application is a continuation-in-part application of U.S. patent application Ser. No. 12/752,570, filed Apr. 1, 2010, entitled: "BRANCHED POLYESTER POLYMERS AND COATINGS COMPRISING THE SAME".

FIELD OF THE INVENTION

The present invention relates to crosslinkable branched polyester polymers prepared by free radical polymerization of the double bonds of a first unsaturated polyester prepolymer and a second unsaturated polyester prepolymer. The polyester polymers have a Tg of 25° C. or less. The present invention further relates to coatings comprising such polyesters and substrates to which such coatings are applied; the coating, when cured, imparts a soft touch to the substrate.

BACKGROUND OF THE INVENTION

Conventional linear and branched polyester resins produced by the polycondensation of different combinations of polyols and polyacids have been widely used in the coatings industry. They have been used to coat a wide range of metallic and non-metallic substrates used in a number of different industries. These industries particularly include those in which flexible coatings are desired. Particularly suitable examples include substrates used in the packaging industry, coil coatings, and certain industrial and automotive coatings. It is often desired that coatings have a particular "touch feel"; in the consumer electronics industry, for example, it is often desired to have a coating with a "soft feel" or "soft touch". A soft touch coating can impart a range of touch feel, for example, a velvety feel, a silky feel, or a rubbery feel, to a substrate. Notwithstanding the feel of the coating, it would also be desired that the coating have at least some degree of resistance to abrasion, marring, scratching and/or staining. Soft touch coatings having acceptable performance properties are therefore desired.

SUMMARY OF THE INVENTION

The present invention is directed to a crosslinkable branched polyester polymer prepared by free radical polymerization of a double bond of a first unsaturated polyester prepolymer and a double bond of a second unsaturated polyester prepolymer, wherein each prepolymer independently comprises: a) a polyol segment; and b) an unsaturated polycarboxylic acid and/or an anhydride and/or ester thereof; wherein the branched polyester polymer has a Tg of 25° C. or less. Coatings comprising such polyesters are also within the scope of the present invention, as are substrates coated at least in part with such coatings.

DETAILED DESCRIPTION OF THE INVENTION

The present invention is directed to crosslinkable branched polyester polymers generally comprising a reaction product of prepolymers, which prepolymers are the reaction product of components comprising a polyol segment and an unsaturated polycarboxylic acid and/or an anhydride and/or ester thereof. The prepolymers are unsaturated polyesters, and are sometimes referred to herein as an "unsaturated polyester prepolymer", "prepolymer" or like terms. Free radical initiators are used to initiate polymerization through the unsaturation of the unsaturated polyester prepolymers, thereby resulting in a branched polyester. The branched polyester is crosslinkable, which means that it can undergo crosslinking with another compound. That is, the polyester has functionality that will react with functionality on another compound, such as a crosslinker. Reaction of the unsaturation of the prepolymers results in the crosslinkable branched polyester. This polyester is a polymer. It is not a cured coating. The present invention is therefore distinct from art in which crosslinking the points of unsaturation on monomers and/or polymers results in a cured coating.

The unsaturated polyester prepolymer comprises a polyol segment. "Polyol" and like terms, as used herein, refers to a compound having two or more hydroxyl groups. The polyol used to form the polyol segment is sometimes referred to herein as the "polyol segment monomer". Polyols can be chosen to contribute softness to the prepolymer. Polyols can also contribute hardness, however, so the polyol(s) used and amount of each should be selected so that the unsaturated prepolymers, when reacted, result in a branched polyester having a Tg of 25° C. or less. Suitable polyols for use in the invention may be any polyol or mixtures thereof known for making polyesters. Examples include, but are not limited to, alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-caprolactone and ethylene glycol); hydroxy-alkylated bisphenols; polyether glycols, for example, poly(oxytetramethylene) glycol; trimethylol propane, pentaerythritol, di-pentaerythritol, trimethylol ethane, trimethylol butane, dimethylol cyclohexane, glycerol and the like. Suitable unsaturated polyols for use in the invention may be any unsaturated alcohols containing two or more hydroxyl groups. Examples include, but are not limited to, trimethylol propane monoallyl ether, trimethylol ethane monoallyl ether and prop-1-ene-1,3-diol. The polyol segment can also comprise some mono-ol, such as up to 10 weight %, or 5 weight %, based on the total weight of the polyol segment. In certain embodiments, the polyol segment comprises 10 to 90 weight % of the polyester prepolymer, such as 30 to 50 weight %. The percent of polyol in the prepolymer can vary widely depending on the molecular weight of the polyol segment.

The unsaturated polyester prepolymer further comprises an unsaturated polycarboxylic acid/anhydride/ester. Suitable unsaturated polyacids for use in the invention may be any unsaturated carboxylic acid containing two or more carboxy groups and/or an ester and/or anhydride thereof, or mixtures thereof. Examples include, but are not limited to, maleic acid, fumaric acid, itaconic acid, citraconic acid, mesaconic acid and teraconic acid, and/or esters and/or anhydrides thereof. Where the unsaturated polyacid is in the form of an ester, these esters may be formed with any suitable alcohol, such as C1-C18 alkyl esters formed by reaction of a C1-C18 alcohol (e.g. methanol, ethanol, 1-propanol, 1-butanol, 2-butanol, isobutanol, 1-pentanol, 1-pentanol and 1-hexonol) with the polyacid. A particularly suitable unsaturated polyacid is maleic acid, maleic anhydride or a C1-C6 alkyl ester of maleic acid. In certain embodiments the unsaturated polycarboxylic acid/anhydride/ester comprises 3 to 25 weight % of the polyester prepolymer, such as 5 to 20 weight %.

The polyester prepolymer can further comprise one or more monomers that contribute to the overall properties of the polyester, including "softness". For example, one or more monomers that contribute a "soft segment" can be used with the one or more polyols and one or more unsaturated polycarboxylic acids/anhydrides/esters. As used herein, "soft segment" and like terms refers to a monomer or residue thereof or mixtures thereof that contribute flexibility to the prepolymer, and can help to obtain the desired Tg and/or viscosity of the branched polyester. The soft segment can be the residue of, for example, a polyacid. "Polyacid" and like terms, as used herein, refers to a compound having two or more acid groups and includes the ester and/or anhydride of the acid. Such acids can include, for example, linear acids that impart flexibility. Examples include but are not limited to saturated polyacids such as adipic acid, azelaic acid, sebacic acid, succinic acid, glutaric acid, decanoic diacid, dodecanoic diacid and esters and anhydrides thereof. Suitable monoacids include $C_1$-$C_{18}$ aliphatic carboxylic acids such as acetic acid, propanoic acid, butanoic acid, hexanoic acid, oleic acid, linoleic acid, undecanoic acid, lauric acid, isononanoic acid, other fatty acids, and hydrogenated fatty acids of naturally occurring oils; and/or esters and/or anhydrides of any of these.

In certain embodiments, one or more additional acids can also be used. For example, the additional acid can be an aromatic acid or a cycloaliphatic acid, suitable examples of which include, but are not limited to, phthalic acid, isophthalic acid, 5-tert-butylisophthalic acid, tetrachlorophthalic acid, benzoic acid, t-butylbenzoic acid, tetrahydrophthalic acid, naphthalene polycarboxylic acid, terephthalic acid, hexahydrophthalic acid, methylhexahydrophthalic acid, dimethyl terephthalate, cyclohexane dicarboxylic acid, chlorendic anhydride, 1,3-cyclohexane dicarboxylic acid, 1,4-cyclohexane dicarboxylic acid, tricyclodecane polycarboxylic acid, endomethylene tetrahydrophthalic acid, endoethylene hexahydrophthalic acid, cyclohexanetetra carboxylic acid, cyclobutane tetracarboxylic acid and esters and anhydrides thereof and/or combinations thereof. It will be appreciated that some of the additional acids listed above may impart rigidity to the branched polyester and therefore cause the Tg of the branched polyester to increase. When one or more of the above acids are used, therefore, the acids used and amounts of each acid should be selected so that, when the prepolymers are reacted, the branched polyester has a Tg of 25° C. or less.

Other monomer components can also be used in formation of the prepolymer to impart one or more additional properties to the branched polyester and/or coating comprising the same. For example, phthalic anhydride can be included, such as in amounts of 2 to 20 weight % of the prepolymer; phthalic anhydride might impart greater stain resistance to the coating. In addition, copolymerization of the unsaturated prepolymer with PDMS silmer acrylate could impart flexibility and/or improve fingerprint resistance in the final coating. Such silmer acrylate monomer can be used in any suitable amount, such as 0.1 to 10 wt %. Fatty diacids could be added to increase hydrophobicity, while a polyether such as poly THF could be used to make the branched polyester more hydrophilic.

The unsaturated polyester prepolymer can be prepared by any means known in the art. In one embodiment, a soft segment and polyol segment are prereacted to form what is sometimes referred to herein as a "polyol prepolymer", and then further reacted with the unsaturated polycarboxylic acid/anhydride/ester. In another embodiment, the polyol segment and unsaturated polycarboxylic acid/anhydride/ester are reacted together either with or without the soft segment. The polyol is typically in excess as compared to the soft segment when a soft segment is included. For example, the ratio of reactive groups on the soft segment monomer to reactive groups on the polyol segment monomer may be 1:2, 2:3 or even higher. The higher the ratio, the higher the molecular weight of the reaction product. Because an excess of polyol is used, the reaction product has terminal hydroxyl functionality. This functionality remains unreacted in the preparation of the branched polyester, thereby rendering the polyester "crosslinkable" with another compound. Similarly, when a soft segment is not used, the prepolymer has terminal hydroxyl or acid functionality that can be crosslinked with another compound.

As noted above, according to the present invention, the Tg of the crosslinkable, branched polyester is 25° C. or less. In certain embodiments, the Tg of the prepolymers reacted to form the branched polyester is also 25° C. or less. In other embodiments, the Tg of one or more prepolymers may be greater than 25° C. while the Tg of one or more prepolymers may be 25° C. or less, such that, when reacted, the resulting branched polyester has a Tg of 25° C. or less.

Following formation of the unsaturated polyester prepolymers, the prepolymers are then polymerized in the presence of a free radical initiator. That is, the unsaturation on a first polyester prepolymer is reacted with the unsaturation on a second polyester prepolymer. It will be appreciated that reaction occurs through free radical polymerization. Any free radical initiator typically used to initiate the polymerization of unsaturated compounds containing double bonds may be used in the free radical polymerization. For example, the free radical initiator can be an azo initiator or a peroxide initiator, such as tert-butyl peroxy-2-ethylhexanoate, tert-butyl peroxybenzoate or dibenzoyl peroxide. The ratio of initiator to unsaturated acid/anhydride/ester may be varied depending upon the degree of branching of the chains of the polyester that is desired. For example, the molar ratio of the initiator to the double bonds may be 0.001 to 1.0, such as 0.01 to 0.9 or 0.5 to 1.

If a higher amount of initiator is used, the more branching will be achieved. Increased branching typically means higher functionality in the polyester. In certain embodiments, a lower amount of initiator may be used, such as 0.1, so as to minimize the amount of branching and retain some unsaturation in the polyester. Such embodiment might provide particularly desirable flexibility in the final coating.

Unsaturation from one acid/anhydride/ester moiety in the prepolymer reacts with the unsaturation of another prepolymer. The result is a branched polyester polymer. At least some if not all of the branches will have terminal hydroxyl groups. There may also be pendant functionality in the branched polyester as well, depending on the starting materials used. Typically, when initiator is used in conjunction with unsaturated acid/anhydride/esters, a linear polymer results. It was therefore a very surprising and unexpected result to achieve a branched polyester according to the present invention. It will be appreciated that the branching in the present invention is predominantly achieved through reaction of the unsaturation. It is possible to contribute a minor degree of branching through the use of a tri- or tetra-ol, although the amount of such compound should be selected to avoid gellation. It will be appreciated that the present methods for achieving branching through the use of polymerizing the unsaturation of a polycarboxylic acid and polyesters resulting therefrom are quite unique when compared with conventional branched polyesters, such as those made through the use of tri- or tetra-ols.

In certain embodiments, the present branched polyesters have a degree of branching or Mark-Howink parameter of less that 0.58, such as 0.50 or less or 0.48 or less as measured by triple detector GPC.

Depending upon the degree of control of the polymerization that is desired, the initiator can be added in different portions at different times. For example, all of the free radical initiator may be added at the start of the reaction, the initiator may be divided into portions and the portions added at intervals during the reaction, or the initiator may be added as a continuous feed. It will be appreciated that the addition of initiator at set intervals or in a continuous feed will result in a more controlled process than adding all of the initiator at the start. In certain embodiments, the initiator is added over 10 minutes, until the molecular weight of the polyester doubles or triples. The free radical polymerization can be conducted under various conditions allowing for parameters such as the molecular weight of the branched polyester, the degree of functionality, the amount of branching and the like to be controlled so as to obtain the branched polyester that gives the desired feel and properties to the final coating.

Regardless of the manner in which the polyester prepolymer is made, whether a polyol prepolymer is formed first or a soft segment monomer, if used, and polyol segment monomer are reacted directly with the polycarboxylic acid/anhydride/ester, how and when the initiator is added, and the like, the resulting branched polyester will actually be a mixture of polyesters with varying degrees of unsaturation, chain length, branching and the like. Some of the resulting product may even be a monoester, but is still encompassed by the term "polyester" as used herein.

The temperature at which the free radical polymerization reaction is conducted may be varied depending on factors such as the composition of the unsaturated acid/anhydride/ester, the polyol segment monomer, the soft segment monomer, if used, the initiator, the solvent and the properties that are desired in the polyester. Typically, the free radical polymerization is conducted at a temperature of from 50° C. to 150° C. In a typical polymerization, such as an acrylic polymerization, the higher temperature results in a higher concentration of free radical initiator, which in turn results in more chains being polymerized, each with a relatively low molecular weight. It has been surprisingly discovered in the present system, particularly when maleic is used, the higher the initiator concentration, the higher the molecular weight of the resulting polymer. This is a surprising result as those skilled in the art would not have expected the present polymerization to occur. Too much initiator, however, can lead to gellation. In certain embodiments, therefore, the polyester of the present invention is ungelled.

While any means can be used to effect the polymerization, for ease of handling, the free radical polymerization can be performed using solutions of the unsaturated acid/anhydride/ester and polyol prepolymer (or soft segment monomer and polyol segment monomer). Any solvent may be used, as long as it is able to dissolve the components including the free radical initiator to a sufficient degree to allow the polymerization to take place efficiently. Typical examples of suitable solvents include butyl glycol, propylene glycol mono methyl ether, methoxy propyl acetate and xylene. Preparation of the polyester in solvent is sometimes referred to herein as a "solvent-based system", which means that greater than 50%, such as up to 100%, of the solvent is an organic solvent, and less than 50% of the solvent, such as less than 20%, less than 10%, less than 5%, or less than 2% of the solvent is water.

Alternatively, the polyester can be prepared in a water-based system. A "water-based system" is one in which greater than 50%, such as up to 100%, of the solvent is water, and less than 50% of the solvent, such as less than 20%, less than 10%, less than 5%, or less than 2% of the solvent is an organic solvent. In certain embodiments, however, the polymerization is done without solvent; that is, all steps from making the prepolymer to making the polyester, can be done in the absence of solvent.

In any of the solvent-based systems, the water-based system, or solvent-free system, the resulting polyester can be a liquid, such as a viscous liquid.

As noted above, the branched polyesters of the present invention are formed by free radical polymerization via the double bonds of a first and second unsaturated polyester prepolymer. The first and second prepolymers can be the same or different. In certain embodiments, two or more different unsaturated polyester prepolymers can be reacted together. "Different", in this context, means that one or more components used in the unsaturated polyester prepolymers and/or the amount of one or more components used in the unsaturated polyester prepolymers can be different. For example, polyester according to the present invention can be prepared using polyol prepolymers comprised of the same components, while in other embodiments they can be prepared by using two or more polyol prepolymers that are formed by different components. That is, a first polyol prepolymer comprising a terminal hydroxyl group and a second polyol prepolymer comprising a terminal hydroxyl group are reacted with an unsaturated acid/anhydride/ester; the components used to make the first and second prepolymers can be different, and/or can have one or more different components and/or can have one or more different amounts if the same components are used. In this embodiment, the resulting polyester is likely to have random units derived from each type of prepolymer used. Thus, the present invention encompasses polyesters prepared by prepolymers having the same or different polyol segments monomers, and/or unsaturated acids/anhydrides/esters and/or the same or different amounts of any of these; moreover, each of the prepolymers can have the same or different soft monomers and/or additional acid monomers and/or the same or different amounts of any of these. Use of different polyol prepolymers, soft segment monomers, polyol segment monomers, additional monomers, unsaturated acids/anhydrides/esters and/or amounts of any of these may result in polyesters having different properties. In this manner, polyesters can be formed that have a Tg of 25° C. or less and possibly other desirable properties deriving from the use of the particular components used in the prepolymers.

In particularly suitable embodiments, prepolymers used according to the present invention comprise adipic acid (soft segment) such as in an amount of 10 to 60 weight %, 2-methyl-1,3-propanediol (polyol segment) such as in an amount of 0 to 50 weight %, and maleic anhydride, such as in an amount of up to 25 weight %, such as 5 to 20 weight %, with weight % based on total monomer weight in the prepolymer. Additional monomer can also be used, such as isophthalic acid or terephthalic acid, phthalic acid, succinic acid, and neopentyl glycol.

As noted above, the branched polyester is formed by using free radical polymerization, wherein the unsaturation of the polycarboxylic acid/anhydride/ester moieties in the prepolymers polymerize. In certain embodiments as noted above, the reaction is run such that substantially all of the unsaturation is reacted in the formation of the branched polyester, while in other embodiments the resulting polyester also comprises some degree of unsaturation. For example, the resulting polyester can comprise enough unsaturation to render the polyester reactive with other functional groups through the points of unsaturation.

Because the branched polyester according to the present invention is formed primarily through the free radical polymerization of the unsaturation in the prepolymers, the terminal hydroxyl groups will remain unreacted in the branched polyester of the present invention. These unreacted hydroxyl groups can then be crosslinked with another component. Thus, the present invention is distinct from art in which gelled polyesters, that is extensively networked polyesters, are formed. The present polyesters are thermoset, and therefore also distinct from art that teaches thermoplastic polyesters.

In certain embodiments it may be desirable to convert some or all of the hydroxyl functionality on the unsaturated polyester prepolymer before polymerization takes place, and/or on the branched polyester, to another functionality. For example, the hydroxyl can be reacted with a cyclic anhydride to result in acid functionality. Acid esters can also be formed.

In certain other embodiments, the unsaturated polyester prepolymer may comprise linkages in addition to the ester linkages. For example, the polyester prepolymer may further comprise one or more urethane linkages. Urethane linkages could be introduced by reacting an excess of the polyol prepolymer or the unsaturated polyester polymer with a polyisocyanate. The resulting unsaturated polyester prepolymer will still have terminal functionality and unsaturation, but will have urethane linkages in addition to ester linkages. Other chemistries could also be introduced. Accordingly, in certain embodiments, the unsaturated polyester prepolymer comprises one ore more linkages in addition to ester linkages.

In certain other embodiments, the use of unsaturated monomers other than the unsaturated polyacid/anhydride/ester of the prepolymer product is excluded. For example, the use of vinyl monomers such as (meth)acrylates, styrene, vinyl halides and the like can be excluded in certain embodiments. In such embodiments, PDMS silmer acrylate can still be used if the double bond of the acrylate moiety is reacted in the formation of the prepolymer. Similarly, or any other acrylate or methacrylate containing monomer or polymer can be used if the double bond of the acrylate moiety is reacted in the formation of the prepolymer. That is, the acrylate double bond is reacted and therefore unavailable to react with the unsaturation of a second prepolymer during free radical polymerization. It will be appreciated that the present branched polyesters are not polyester/acrylic graft copolymers, which are widely known in the art and are not formed by reaction of unsaturation on first and second polyester prepolymers.

In certain embodiments, the present polyesters specifically exclude polyesters prepared from prepolymers that are formed by the reaction with aldehydes; thus, in this embodiment, acyl succinic acid polyesters are specifically excluded. Similarly, use of aldehyde in the solvent is specifically excluded in certain embodiments of the invention.

The branched polyesters of the present invention can have a relatively high molecular weight and functionality as compared to conventional linear polyester resins. Typically, the ratio of the weight average molecular weight ("$M_W$") of the branched polyester of the present invention to the $M_W$ of the unsaturated polyester prepolymer is from 1.2 to 100, such as 4 or 5 to 50, although in certain embodiments, it can be as higher.

In certain embodiments, the polyester prepolymers can have an Mw of 1,000 to 50,000, such as 5,000 to 10,000 or 7,000 to 8,000. In addition, the final branched polyester can have an Mw in the range of 2,000 to 100,000, such as 4,000-10,000. The prepolymer $M_W$ can be related to the properties of the branched polyester as well as a coating comprising the polyester. For example, a branched polyester with an $M_W$ at the lower end of the range, such as less than 10,000, might give a higher crosslink density or hardness in the coating as there would be higher functionality, and might have better flow and lower viscosity, while a branched polyester with an $M_W$ higher than 10,000 might provide a coating with a lower crosslink density or hardness, but with a different touch feel.

In certain embodiments, the equivalent weight of the polyester is 1000 or less. Equivalent weight is the $M_W$ divided by the average functionality. Equivalent weight contributes to the crosslink density, which, as noted above, may affect the properties of soft touch coatings. For example, a higher equivalent weight may give a lower crosslink density.

In addition to the molecular weight described above, the branched polyesters of the present invention can also have a relatively high functionality; in some cases the functionality is higher than would be expected for conventional polyesters having such molecular weights. The average functionality of the polyester can be 2.0 or greater, such as 2.5 or greater, 3.0 or greater, or even higher. "Average functionality" as used herein refers to the average number of functional groups on the branched polyester. The functionality of the branched polyester is measured by the number of hydroxyl groups that remain unreacted in the branched polyester, and not by the unreacted unsaturation. In certain embodiments, the hydroxyl value of the branched polyesters of the present invention can be from 10 to 500 mg KOH/gm, such as 30 to 250 mg KOH/gm. In certain embodiments, the present branched polyesters will have both high $M_W$ and high functionality, such as a $M_W$ of ≥15,000, such as 20,000 to 40,000, or higher than 40,000, and a functionality of ≥100 mg KOH/gm.

Because the polyester of the present invention comprises functionality, it is suitable for use in coating formulations in which the hydroxyl groups (and/or other functionality) are crosslinked with other resins and/or crosslinkers typically used in coating formulations. Thus, the present invention is further directed to a coating comprising a branched polyester according to the present invention and a crosslinker therefor. The crosslinker, or crosslinking resin or agent, can be any suitable crosslinker or crosslinking resin known in the art, and will be chosen to be reactive with the functional group or groups on the polyester. It will be appreciated that the coatings of the present invention cure through the reaction of the hydroxyl groups and/or other functionality and the crosslinker and not through the double bonds of the polycarboxylic acid/anhydride/ester moiety, to the extent any such unsaturation exists in the branched polyester.

Non-limiting examples of suitable crosslinkers include phenolic resins, amino resins, epoxy resins, isocyanate resins, beta-hydroxy (alkyl) amide resins, alkylated carbamate resins, polyacids, anhydrides, organometallic acid-functional materials, polyamines, polyamides, aminoplasts and mixtures thereof. In certain embodiments, the crosslinker is a phenolic resin comprising an alkylated phenol/formaldehyde resin with a functionality≥3 and difunctional o-cresol/formaldehyde resins. Such crosslinkers are commercially available from Hexion as BAKELITE 6520LB and BAKELITE 7081LB.

Suitable isocyanates include multifunctional isocyanates. Examples of multifunctional polyisocyanates include aliphatic diisocyanates like hexamethylene diisocyanate and isophorone diisocyanate, and aromatic diisocyanates like toluene diisocyanate and 4,4'-diphenylmethane diisocyanate.

The polyisocyanates can be blocked or unblocked. Examples of other suitable polyisocyanates include isocyanurate trimers, allophanates, and uretdiones of diisocyanates and polycarbodiimides such as those disclosed in U.S. Pat. No. 8,389,113, incorporated by reference in pertinent part herein. Suitable polyisocyanates are well known in the art and widely available commercially. For example, suitable polyisocyanates are disclosed in U.S. Pat. No. 6,316,119 at columns 6, lines 19-36, incorporated by reference herein. Examples of commercially available polyisocyanates include DESMODUR VP2078 and DESMODUR N3390, which are sold by Bayer Corporation, and TOLONATE HDT90, which is sold by Rhodia Inc.

Suitable aminoplasts include condensates of amines and/or amides with aldehyde. For example, the condensate of melamine with formaldehyde is a suitable aminoplast. Suitable aminoplasts are well known in the art. A suitable aminoplast is disclosed, for example, in U.S. Pat. No. 6,316,119 at column 5, lines 45-55, incorporated by reference herein.

In preparing the present coatings, the branched polyester and the crosslinker can be dissolved or dispersed in a single solvent or a mixture of solvents. Any solvent that will enable the formulation to be coated on a substrate may be used, and these will be well known to the person skilled in the art. Typical examples include water, organic solvent(s), and/or mixtures thereof. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. In certain embodiments, the solvent is a non-aqueous solvent. "Non-aqueous solvent" and like terms means that less than 50% of the solvent is water. For example, less than 10%, or even less than 5% or 2%, of the solvent can be water. It will be understood that mixtures of solvents, including or excluding water in an amount of less than 50%, can constitute a "non-aqueous solvent". In other embodiments, the coating is aqueous or water-based. This means that 50% or more of the solvent is water. These embodiments have less than 50%, such as less than 20%, less than 10%, less than 5% or less than 2% solvent.

In certain embodiments, the coatings of the present invention further comprise a curing catalyst. Any curing catalyst typically used to catalyze crosslinking reactions between polyester resins and crosslinkers, such as phenolic resins, may be used, and there are no particular limitations on the catalyst. Examples of such a curing catalyst include dibutyltin dilaurate, phosphoric acid, alkyl aryl sulphonic acid, dodecyl benzene sulphonic acid, dinonyl naphthalene sulphonic acid, and dinonyl naphthalene disulphonic acid.

It will be appreciated that a number of factors should be balanced to give the desired "touch" to the final coating. As noted above, monomer selection and content may play a role, as might $M_w$, equivalent weight, and degree of branching. The Tg of the branches can be decreased so as to increase the "soft touch" quality of the coating. In addition, the selection of crosslinker can also contribute to the soft touch. For example, the crosslinker and amount of crosslinker used can be selected to give the desired crosslink density, which, as noted above, relates to touch feel. In certain embodiments, the gloss of the coating at 60° is 0.5-1.5.

If desired, the coating compositions can comprise other optional materials well known in the art of formulating coatings, such as colorants, plasticizers, abrasion resistant particles, anti-oxidants, hindered amine light stabilizers, UV light absorbers and stabilizers, surfactants, flow control agents, thixotropic agents, fillers, organic cosolvents, reactive diluents, catalysts, grind vehicles, slip agents and other customary auxiliaries.

As used herein, the term "colorant" means any substance that imparts color and/or other opacity and/or other visual effect, e.g. gloss, to the composition. The colorant can be added to the coating in any suitable form, such as discrete particles, dispersions, solutions and/or flakes. A single colorant or a mixture of two or more colorants can be used in the coatings of the present invention.

Example colorants include matting pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U.S. Pat. No. 7,605,194 at column 3, line 56 to column 16, line 25, the cited portion of which being incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/ or at least partially bound to a polymer and/or polymerizable component in accordance with a non-limiting embodiment of the present invention, have minimal migration out of the coating. Example photosensitive compositions and/or photochromic compositions and methods for making them are identified in U.S. Pat. No. 8,153,344, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

Any slip agent can be used according to the present invention such as those commercial available from BYK Chemie or Dow Corning.

In certain embodiments, the polyesters of the present invention are used as coating additives. For example, it has been discovered that the present polyesters can replace all or part of the sag control agent, such as cellulose esters, used in coating formulations comprising metallic flake. It will be appreciated that the branched polyester of the present invention and crosslinker therefor can form all or part of the film-forming resin of the coating. In certain embodiments, one or more additional film-forming resins are also used in the coating. For example, the coating compositions can comprise any of a variety of thermoplastic and/or thermosetting compositions known in the art. The coating compositions may be water-based or solvent-based liquid compositions, or alternatively, may be in solid particulate form, i.e. a powder coating.

Thermosetting or curable coating compositions typically comprise film-forming polymers or resins having functional groups that are reactive with either themselves or a crosslinking agent. The additional film-forming resin can be selected from, for example, acrylic polymers, polyester polymers, polyurethane polymers, polyamide polymers, polyether polymers, polysiloxane polymers, copolymers thereof, and mixtures thereof. Generally, these polymers can be any polymers of these types made by any method known to those skilled in the art. Such polymers may be solvent-borne or water-dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of film-forming resins may also be used in the preparation of the present coating compositions.

Thermosetting coating compositions typically comprise a crosslinking agent that may be selected from any of the crosslinkers described above. In certain embodiments, the present coatings comprise a thermosetting film-forming polymer or resin and a crosslinking agent therefor and the crosslinker is either the same or different from the crosslinker that is used to crosslink the branched polyester. In certain other embodiments, a thermosetting film-forming polymer or resin having functional groups that are reactive with themselves are used; in this manner, such thermosetting coatings are self-crosslinking.

The coatings of the present invention may comprise 1 to 100, such as 10 to 90 or 20 to 80 weight %, with weight % based on total solid weight of the coating, of the branched polyester of the present invention. The coating compositions of the present invention may also comprise 0 to 90, such as 5 to 60 or 10 to 40 weight %, with weight % based on total solids weight of the coating, of a crosslinker for the branched polyester. Additional components, if used, may comprise 1 weight %, up to 70 weight %, or higher, with weight % based on total solids weight of the coating.

Coating formulations according to the present invention can have a soft touch and/or smooth feel when cured on a substrate. For example, the coating can have a softness as measured by the Fischer Micro-hardness test of 1 to 20 $N/mm^2$, such as 2 to 10 $N/mm^2$. The coating can further have a coefficient of friction as measured by ASTM Method D1894 of 0.01 to 0.5, such as 0.05 to 0.2. "Coefficient of friction" refers to the ratio of the force that maintains contact between an object and a surface and the frictional force that resists the motion of the object. The coating, at 50 micron thickness, can have an abrasion resistance as measured by ASTM Method F2357 of 50 to 500 cycles, such as 250 to 500. The cured coating can also have a surface roughness of 1 µm to 80 µm, such as 10 µm to 60 µm, 20 µm to 50 µm, or 35 µm to 45 µm as measured by a Taylor Hobson Precision Duo Profilometer. Surface roughness can be altered through formulation, such as through the use of additives, an example of which is silica. It will be appreciated by those skilled in the art that achieving this level of hardness, coefficient of friction, abrasion resistance, and surface roughness in the same coating is a remarkable accomplishment. The result is a coating that is soft to the touch, but durable. While the inventors believe this combination of properties is achieved due to the branching of the polyester, they do not wish to be bound by any mechanism.

In certain embodiments, the prepolymers, the branched polyester and/or the coatings of the present invention, may be substantially free, may be essentially free and/or may be completely free of bisphenol A and derivatives or residues thereof, including bisphenol A ("BPA") and bisphenol A diglycidyl ether ("BADGE"). Such prepolymers, branched polyesters and/or coatings are sometimes referred to as "BPA non intent" because BPA, including derivatives or residues thereof, are not intentionally added but may be present in trace amounts because of impurities or unavoidable contamination from the environment. The prepolymers, branched polyesters and/or coatings can also be substantially free and may be essentially free and/or may be completely free of bisphenol F and derivatives or residues thereof, including bisphenol F and bisphenol F diglycidyl ether ("BFDGE"). The term "substantially free" as used in this context means the prepolymers, branched polyesters and/or coatings contain less than 1000 parts per million (ppm), "essentially free" means less than 100 ppm and "completely free" means less than 20 parts per billion (ppb) of any of the above mentioned compounds, derivatives or residues thereof.

The present coatings can be applied to any substrates known in the art, for example, automotive substrates, industrial substrates, packaging substrates, wood flooring and furniture, apparel, electronics including housings and circuit boards including consumer electronics such as housings for computers, notebooks, smartphones, tablets, televisions, gaming equipment, computer equipment, computer accessories, MP3 players, and the like, glass and transparencies, sports equipment including golf balls, and the like. These substrates can be, for example, metallic or non-metallic. Metallic substrates include tin, steel, tin-plated steel, chromium passivated steel, galvanized steel, aluminum, aluminum foil. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect.

The coatings of the present invention can be applied by any means standard in the art, such as electrocoating, spraying, electrostatic spraying, dipping, rolling, brushing, and the like.

The coatings can be applied to a dry film thickness of 0.04 mils to 4 mils, such as 0.3 to 2 or 0.7 to 1.3 mils. In other embodiments the coatings can be applied to a dry film thickness of 0.1 mils or greater, 0.5 mils or greater 1.0 mils or greater, 2.0 mils or greater, 5.0 mils or greater, or even thicker. The coatings of the present invention can be used alone, or in combination with one or more other coatings. For example, the coatings of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

It will be appreciated that the coatings described herein can be either one component ("1K"), or multi-component compositions such as two component ("2K") or more. A 1K composition will be understood as referring to a composition wherein all the coating components are maintained in the same container after manufacture, during storage, etc. A 1K coating can be applied to a substrate and cured by any conventional means, such as by heating, forced air, and the like. The present coatings can also be multi-component coatings, which will be understood as coatings in which various components are maintained separately until just prior to application. As noted above, the present coatings can be thermoplastic or thermosetting.

In certain embodiments, the coating is a clearcoat. A clearcoat will be understood as a coating that is substantially transparent or translucent. A clearcoat can therefore have some degree of color, opacity provided it does not make the clearcoat opaque or otherwise affect, to any significant degree, the ability to see the underlying substrate. The clearcoats of the present invention can be used, for example, in conjunction with a pigmented basecoat. The clearcoat can be formulated as is know in the coatings art.

In certain other embodiments the coating comprises a colorant, such as a pigmented basecoat used in conjunction with a clearcoat, or as a pigmented monocoat. Such coating layers are used, for example, in the automotive industry to impart a decorative and/or protective finish to a vehicle. "Vehicle" is used herein in its broadest sense and includes all types of vehicles, such as but not limited to cars, trucks, buses, vans, golf carts, motorcycles, bicycles, railroad cars and the like. It will be appreciated that the portion of the vehicle that is coated according to the present invention may vary depending on why the coating is being used. For example, anti-chip primers may be applied to some of the portions of the vehicle as described above. When used as a colored basecoat or monocoat, the present coatings will typically be applied to those portions of the vehicle that are visible such as the roof, hood, doors trunk lid and the like, but may also be applied to other areas such as inside the trunk, inside the door and the like; they can also be applied to those portions of the car that are in contact with the driver and/or passengers, such as the steering wheel, dashboard, gear shift, controls, door handle and the like. Clearcoats will typically be applied to the exterior of a vehicle.

In another embodiment, the present invention is directed to a substrate coated at least in part with the coating of the present invention, wherein the substrate comprises a consumer electronic part. "Consumer electronic part" includes, for example, any part or housing of computers, notebooks, smartphones, tablets, televisions, gaming equipment, computer accessories, MP3 players, and the like. The coatings are typically applied to at least the exterior of the housing of such equipment, but may also be applied in whole or in part to the interior of such housing as well. The present coatings are particularly suitable for application to consumer electronics as they can provide the desired soft touch and durability.

Coil coatings, having wide application in many industries, are also substrates that can be coated according to the present invention; the present coatings are particularly suitable as coil coatings due to their unique combination of flexibility and hardness, as discussed above. Coil coatings also typically comprise a colorant.

The coatings of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. In certain embodiments, the package is a metal can. The term "metal can" includes any type of metal can, container or any type of receptacle or portion thereof used to hold something. One example of a metal can is a food can; the term "food can(s)" is used herein to refer to cans, containers or any type of receptacle or portion thereof used to hold any type of food and/or beverage. Metal "bottles" that mimic the shape of glass bottles are also "metal cans" according to the present invention. The term "metal can(s)" specifically includes food cans and also specifically includes "can ends", which are typically stamped from can end stock and used in conjunction with the packaging of beverages. The term "metal cans" also specifically includes metal caps and/or closures such as bottle caps, screw top caps and lids of any size, lug caps, and the like. Metal cans can be used to hold other items as well as food and/or beverage, including but not limited to personal care products, bug spray, spray paint, and any other compound suitable for packaging in an aerosol can. The cans can include "two-piece cans" and "three-piece cans" as well as drawn and ironed one-piece cans; such one-piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. In some embodiments, the coating is applied to a coil or sheet by roll coating; the coating is then cured by radiation and can ends are stamped out and fabricated into the finished product, i.e. can ends. In other embodiments, the coating is applied as a rim coat to the bottom of the can; such application can be by roll coating. The rim coat functions to reduce friction for improved handling during the continued fabrication and/or processing of the can. In certain embodiments, the coating is applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Substrates coated according to the present invention can be coated with any of the compositions described above by any means known in the art, such as spraying, rolling, dipping, brushing, flow coating and the like; the coating may also be applied by electrocoating when the substrate is conductive. The appropriate means of application can be determined by one skilled in the art based upon the type of substrate being coated and the function for which the coating is being used. The coatings described above can be applied over the substrate as a single layer or as multiple layers with multiple heating stages between the application of each layer, if desired. After application to the substrate, the coating composition may be cured by any appropriate means.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" polyester, "a" branched polyester, "an" unsaturated acid/anhydride/ester, "a" polyol pre-polymer, "a" soft segment, "a" soft monomer, "a" polyol segment, "a" polyol segment monomer, "a" prepolymer, "a" crosslinker, and the like, one or more of each of these and any other components can be used. As used herein, the term "polymer" refers to oligomers and both homopolymers and copolymers, and the prefix "poly" refers to two or more. Including, for example and like terms means including for example but not limited to. When ranges are given, any endpoints of those ranges and/or numbers within those ranges can be combined within the scope of the present invention.

EXAMPLES

The following examples are intended to illustrate the invention and should not be construed as limiting the invention in any way.

Hardness was measured with the HM2000S Fischer Microhardness Instrument following the instruction described in the Fischerscope HM2000 Manual. Three measurements were conducted and the average hardness value was recorded and reported.

Coefficient of Friction testing was conducted using a Dynisco 1055 Coefficient of Friction Tester, a Chatillion DGGS Force Gauge and a green felt sled. Five tests were run on each sample. Five measurements were conducted and the average hardness value was recorded and reported.

Surface roughness was measured by a Taylor Hobson Precision Surtronic Duo Profilometer, following the instructions provided by the manufacturer.

Abrasion resistance was measured according to ASTM Method F2357.

Example 1

A branched polyester according to the present invention was prepared as follows. 650 grams of 2-methyl-1,3-propanediol, 177 grams of adipic acid, 287 grams of isophthalic acid, 179 grams of phthalic anhydride, 223 grams of maleic anhydride and 1.5 grams of butylstannoic acid were added to a 3-liter, 4-neck round bottom flask equipped with a stirrer, a steam-cooled column topped with a distillation head and a thermocouple. The contents were heated slowly under a flow of nitrogen gas. The contents of the flask were heated to about 95° C. at which time they were melted and stirring was started. The batch was heated to 155° C. at which time water began distilling. Heating was continued to a batch temperature of 220° C. 160 grams of water was removed from the reaction. The final acid value of the resin was measured as 3.8. The contents of the batch were cooled to 150° C. and 316 grams of Aromatic 100 was added. The material in the flask was then cooled and poured out. The solids content was 81% by weight. The OH number of the resin was 50.2 at 81% solids. The weight average molecular weight of the product was 5700 against a polystyrene control. The Tg of the prepolymer was −11° C.

988 grams of the above resin were placed in a 3-liter, 4-neck round bottom flask equipped with a stirrer, a water-cooled condenser, an addition funnel and a thermocouple. The contents of the flask were heated to 120° C. 2 grams of tert-butyl peroctoate and 153 grams of butyl acetate were mixed and placed into the addition funnel. The contents of the funnel were added to the flask over 10 minutes. The temperature of the reaction was maintained at 120° C. for one hour. It was then cooled and the contents poured out. The final resin had a solids content of 70% by weight. The OH number of the resin was 41 at 70% solids. It had a weight average molecular weight of 7900 as measured against a polystyrene standard. The Tg of the polyester was −18° C. as measured with Dynamic Scanning calorimetry.

Example 2

A branched polyester according to the present invention was prepared as follows. 650 grams of 2-methyl-1,3-propanediol, 282 grams of adipic acid, 166 grams of isophthalic acid, 179 grams of phthalic anhydride, 223 grams of maleic anhydride and 1.5 grams of butylstannoic acid were added to a 3-liter, 4-neck round bottom flask equipped with a stirrer, a steam-cooled column topped with a distillation head and a thermocouple. The contents were heated slowly under a flow of nitrogen gas. The contents of the flask were heated to about 95° C. at which time they were melted and stirring was started. The batch was heated to 155° C. at which time water began distilling. Heating was continued to a batch temperature of 220° C. 162 grams of water was removed from the reaction. The final acid value of the resin was measured as 6.1. The contents of the batch were cooled to 150° C. and 313 grams of Aromatic 100 was added. The material in the flask was then cooled and poured out. The solids content was 81% by weight. The OH number of the resin was 43 at 81% solids. The weight average molecular weight of the product was 6600 against a polystyrene control and the Tg of the prepolymer was −18° C.

988 grams of the above resin were placed in a 3-liter, 4-neck round bottom flask equipped with a stirrer, a water-cooled condenser, an addition funnel and a thermocouple. The contents of the flask were heated to 120° C. 2 grams of tert-butyl peroctoate and 153 grams of butyl acetate were mixed and placed into the addition funnel. The contents of the funnel were added to the flask over 10 minutes. The temperature of the reaction was maintained at 120° C. for one hour. It was then cooled and the contents poured out. The final resin had a solids content of 71% by weight. The OH number of the resin was 32 at 71% solids. It had a weight average molecular weight of 9300 as measured against a polystyrene standard. The Tg of the polyester was −22° C. as measured with Dynamic Scanning calorimetry.

Example 3

A branched polyester according to the present invention was prepared as follows. 650 grams of 2-methyl-1,3-propanediol, 711 grams of adipic acid, 152 grams of maleic anhydride and 1.5 grams of butylstannoic acid were added to a 3-liter, 4-neck round bottom flask equipped with a stirrer, a steam-cooled column topped with a distillation head and a thermocouple. The contents were heated slowly under a flow of nitrogen gas. The contents of the flask were heated to about 112° C. at which time they were melted and stirring was started. The batch was heated to 173° C. at which time water began distilling. Heating was continued to a batch temperature of 220° C. A total of 196 grams of water was removed from the reaction. The final acid value of the resin was measured as 2.6. The contents of the batch were cooled to 150° C. and 307 grams of Aromatic 100 was added. The material in the flask was then cooled and poured out. The solids content was 81% by weight. The OH number of the resin was found to be 52 at 81% solids. The weight average molecular weight of the product was found to be 5700 against a polystyrene control. The Tg of the prepolymer was −47° C.

982 grams of the above resin were placed in a 3-liter, 4-neck round bottom flask equipped with a stirrer, a water-cooled condenser, an addition funnel and a thermocouple. The contents of the flask were heated to 120° C. 2 grams of tert-butyl peroctoate and 158 grams of butyl acetate were mixed and placed into the addition funnel. The contents of the funnel were added to the flask over 10 minutes. The temperature of the reaction was maintained at 120° C. for one hour. It was then cooled and the contents poured out. The final resin had a solids content of 71% by weight. The OH number of the resin was found to be 50 at 71% solids. It had a weight average molecular weight of 6700 as measured against a polystyrene standard and a Tg of −48° C.

Example 4

A coating according to the present invention was prepared as follows: 59 grams of polyester resin from Example 1, 17 grams of ethyl acetate, 5 grams of diacetone alcohol, 5 grams of PM acetate, and 0.4 grams of DISPERBYK-103 (a wetting and dispersing additive commercially available from BYK) were added to a half pint metal can equipped with an overhead mechanical stirrer. The above mixture was gently mixed for 5-10 minutes, and 6.5 grams of ACEMATT TS-100 silica (thermal silica commercially available from Evonik Industries) was subsequently added. The mixture was continued to mix under high speed for 20-30 minutes. A total of 1 gram of SILOK-3200 (a coating feeling agent commercially available from Guangzhou Silok Polymers Co., Ltd.), 0.6 grams of BLS 292 (a light stabilizer from Mayzo, Inc.) and 0.1 grams of dibutyltin dilaurate were finally added to the metal can and mixed for another 5 minutes. The resulting mixture was mixed with 21 grams of XPH80002 hardener (HDI trimmer that is commercially available from PPG Industries, Inc.) and reduced with GXS73037 reducer (organic solvent mixture available from PPG Industries, Inc.) to an appropriate spray viscosity. The resulting soft touch paint was sprayed on a polycarbonate substrate and cured at 60° C. for 30 mins with a dry film build around 50 μm. The final soft touch coating on polycarbonate substrate showed hardness of 4.2 N/mm$^2$, a coefficient of friction of 0.06, a surface roughness of 42, and an abrasion resistance of 480 cycles. The coating was tested for stain resistance against common household products and exhibited stain resistance to mustard, ketchup, lipstick, sunscreen, petroleum jelly and hand lotion.

Example 5

A coating according to the present invention was prepared as follows: 59 grams of polyester resin from Example 2, 17 grams of ethyl acetate, 5 grams of diacetone alcohol, 5 grams of PM acetate, and 0.4 grams of DISPERBYK-103 were added to a half pint metal can equipped with an overhead mechanical stirrer. The above mixture was gently mixed for 5-10 minutes, and 6.5 grams of ACEMATT TS-100 silica was subsequently added. The mixture was continued to mix under high speed for 20-30 minutes. A total of 1 gram of SILOK-3200, 0.6 grams of BLS 292 and 0.1 grams of dibutyltin dilaurate were finally added to the metal can and mixed for another 5 minutes. The resulting mixture was mixed with 16 grams of XPH80002 hardener and reduced with GXS73037 reducer to an appropriate spray viscosity. The resulting soft touch paint was sprayed on a polycarbonate substrate and cured at 60° C. for 30 mins with a dry film build around 55 μm. The final soft touch coating on polycarbonate substrate showed hardness of 3.3 N/mm$^2$, a coefficient of friction of 0.07, a surface roughness of 44 and an abrasion resistance of 300 cycles. The coating was tested for stain resistance against common household products and exhibited stain resistance to ketchup, lipstick, sunscreen, petroleum jelly and hand lotion, while slight staining occurred with mustard.

Example 6

A coating according to the present invention was prepared as follows: 59 grams of polyester resin from Example 3, 17 grams of ethyl acetate, 5 grams of diacetone alcohol, 5 grams of PM acetate, and 0.4 grams of DISPERBYK-103 were added to a half pint metal can equipped with an overhead mechanical stirrer. The above mixture was gently mixed for 5-10 minutes, and 6.5 grams of ACEMATT TS-100 silica was subsequently added. The mixture was continued to mix under high speed for 20-30 minutes. A total of 1 gram of SILOK-3200, 0.6 grams of BLS 292 and 0.1 grams of dibutyltin dilaurate were finally added to the metal can and mixed for another 5 minutes. The resulting mixture was mixed with 26 grams of XPH80002 hardener and reduced with GXS73037 reducer to an appropriate spray viscosity. The resulting soft touch paint was sprayed on a polycarbonate substrate and cured at 60° C. for 30 mins with a dry film build around 55 μm. The final soft touch coating on polycarbonate substrate showed hardness of 3.0 N/mm$^2$, a coefficient of friction of 0.07, a surface roughness of 38, and an abrasion resistance of 350 cycles when measured after initial cure and 600 cycles after 5 days. The coating was tested for stain resistance against common household products and exhibited stain resistance to ketchup, sunscreen, petroleum jelly and hand lotion, while slight staining occurred with mustard and lipstick.

What is claimed is:

1. A crosslinkable branched polyester polymer prepared by free radical polymerization of a double bond of a first unsaturated polyester prepolymer and a double bond of a second unsaturated polyester prepolymer, wherein each prepolymer independently comprises:
   a) a polyol segment; and
   b) an unsaturated polycarboxylic acid and/or an anhydride and/or ester thereof;
wherein the branched polyester polymer has a Tg of 25° C. or less.

2. The polyester of claim 1, wherein the prepolymer further comprises a soft segment.

3. The polyester of claim 2, wherein the soft segment comprises adipic acid.

4. The polyester of claim 1, wherein the prepolymer further comprises isophthalic acid.

5. The polyester of claim 1, wherein the polyol segment comprises 2-methyl-1,3-propanediol.

6. The polyester of claim 1, wherein the unsaturated polycarboxylic acid/anhydride/ester comprises maleic acid/anhydride/ester and/or itaconic acid/anhydride/ester.

7. The polyester of claim 2, wherein at least one prepolymer comprises adipic acid, 2-methyl-1,3-propanediol, and maleic acid/anhydride/ester.

8. The polyester of claim 1, wherein the $M_W$ of the prepolymer is 5,000 to 10,000.

9. The polyester of claim 1, wherein the $M_W$ of the polyester is 4,000 to 10,000.

10. The polyester of claim 1, wherein the Mark Howink parameter of the polyester is 0.48 or less.

11. A coating comprising the polyester of claim 1 and a crosslinker therefor.

12. The coating of claim 11, having a hardness as measured by the Fischer Micro-hardness test of 2 to 10 N/mm$^2$, a coefficient of friction as measured by ASTM Method D1894 of 0.05 to 0.2, an abrasion resistance as measured by ASTM Method F2357 of 250 to 500 cycles and/or a surface roughness as measured by a Taylor Hobson Precision Surtronic Duo Profilometer of 20 μm to 50 μm.

13. The coating of claim 11, wherein at least one of the prepolymers comprises adipic acid, 2-methyl-1,3-propanediol, and maleic acid/anhydride/ester.

14. The coating of claim 11, wherein the coating further comprises a colorant.

15. The coating of claim 11, wherein the crosslinker comprises isocyanate.

16. A substrate coated at least in part with the coating of claim 11.

17. The substrate of claim 16, wherein the substrate comprises a consumer electronic part.

18. The substrate of claim 16, wherein the substrate comprises PC/ABS.

19. The substrate of claim 16, wherein the substrate comprises a metal can.

20. The polyester of claim 1, wherein the polyester does not comprise (meth)acrylate or residues thereof.

21. The polyester of claim 1, wherein the only unsaturation in the prepolymers is from component b).

* * * * *